United States Patent
Horibe et al.

(10) Patent No.: US 6,798,725 B1
(45) Date of Patent: Sep. 28, 2004

(54) WAVE-SHAPING APPARATUS AND REPRODUCTION SIGNAL PROCESSING APPARATUS INCLUDING THE SAME

(75) Inventors: Ryusuke Horibe; Shinichi Kawakami; Kazuhiro Aoki; Youichi Kanekami, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/427,287

(22) Filed: Oct. 26, 1999

(30) Foreign Application Priority Data

Oct. 27, 1998 (JP) .......................................... 10-304869

(51) Int. Cl.$^7$ ................................................. G11B 5/09
(52) U.S. Cl. ................................ 369/47.14; 369/47.18; 369/53.32
(58) Field of Search ........................... 369/53.31, 53.33, 369/53.34, 124.01, 124.14, 124.15, 53.15, 47.14, 47.15, 47.17, 47.18, 47.28, 47.35, 53.32

(56) References Cited

U.S. PATENT DOCUMENTS

| | | | |
|---|---|---|---|
| 4,829,499 A | | 5/1989 | Abe |
| 5,715,110 A | * | 2/1998 | Nishiyama et al. ........... 360/67 |
| 5,790,495 A | | 8/1998 | Kimura et al. |

FOREIGN PATENT DOCUMENTS

| | | |
|---|---|---|
| EP | 0 051 343 | 5/1982 |
| EP | 0 581 455 A1 | 7/1993 |
| JP | 62-112230 | 5/1987 |
| JP | 05-110395 | 4/1993 |
| JP | 07-014307 | 1/1995 |
| JP | 08-171780 | 7/1996 |
| JP | 9-237459 | 9/1997 |
| JP | 10-055621 | 2/1998 |
| JP | 10-106160 | 4/1998 |

OTHER PUBLICATIONS

Copy of Japanese Office Action dated Feb. 28, 2003.
Copy of Japanese Office Action dated Jun. 9, 2003.

* cited by examiner

*Primary Examiner*—Paul W. Huber
(74) *Attorney, Agent, or Firm*—Snell & Wilmer, LLP

(57) ABSTRACT

A wave-shaping apparatus includes a first detection circuit for detecting a reproduction signal reproduced from an optical disk by an optical pickup circuit using a first detection time constant to detect an upper envelope of the reproduction signal; a second detection circuit for detecting the reproduction signal using a second detection time constant to detect a lower envelope of the reproduction signal; an averaging circuit for putting a weight represented by a weighting coefficient to each of the upper envelope and the lower envelope to calculate an average value of each of the upper envelope and the lower envelope; and a subtraction circuit for subtracting a signal corresponding to the average value from the reproduction signal to output a wave-shaped signal.

13 Claims, 17 Drawing Sheets

Averaging circuit

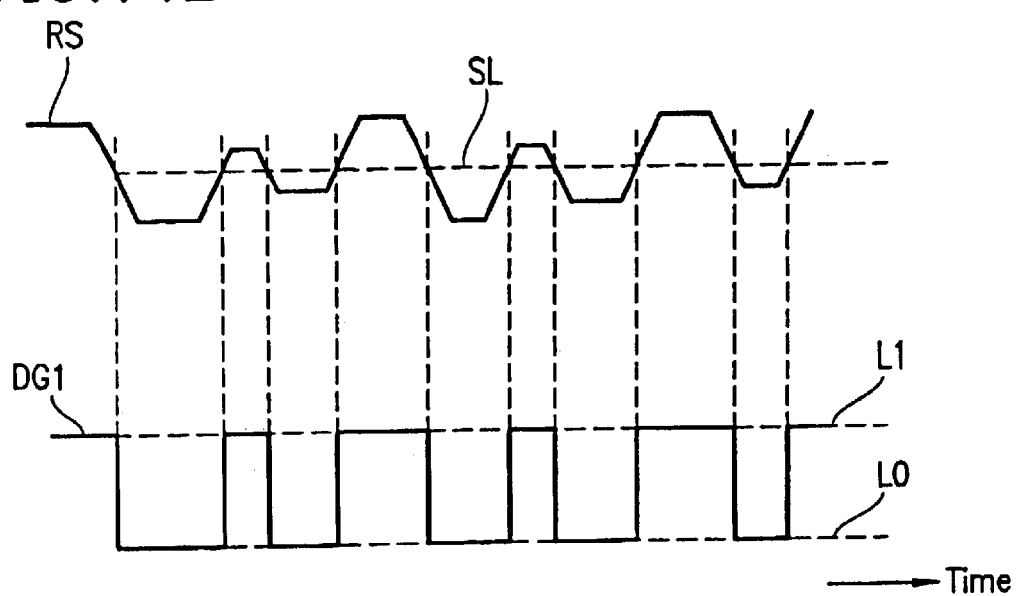

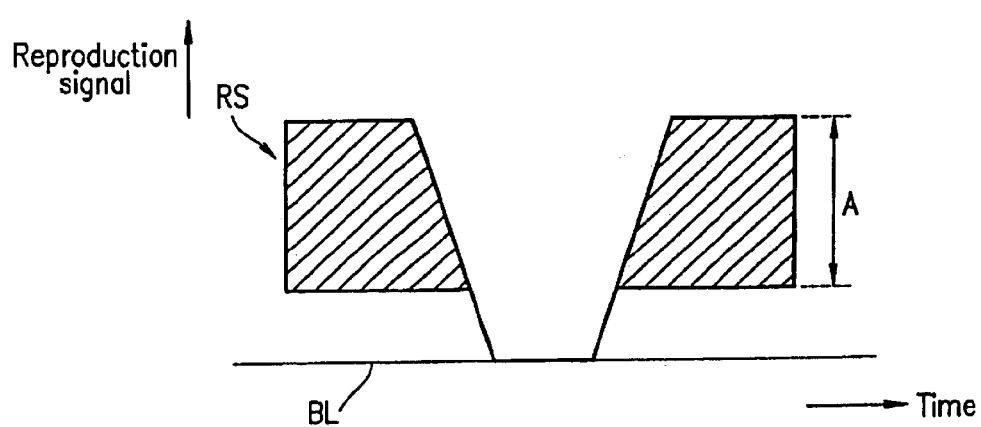

WAVE-SHAPING APPARATUS AND REPRODUCTION SIGNAL PROCESSING APPARATUS INCLUDING THE SAME

BACKGROUND OF THE INVENTION

1. Field of the Invention

The present invention relates to a wave-shaping apparatus and a reproduction signal processing apparatus including the same, and specifically a wave-shaping apparatus for optimally performing digitization or A/D (analog/digital) conversion of a reproduction signal obtained by an optical pickup circuit, and a reproduction signal processing apparatus including the same.

2. Description of the Related Art

Recently, optical disks are being used in various conditions and stored in various manners. Under the circumstances, surfaces of optical disks are often scratched or exposed to dust. In order to read information from an optical disk having dust or scratches, a high precision signal determination is required.

Especially, an optical disk having information at a high density such as a DVD (digital versatile disk) has an inferior SNR (signal/noise ratio) at the shortest pit portion. Accordingly, it is required to minimize errors when a signal is digitized.

Information recording to a CD (compact disk) is performed by EFM (eight to fourteen modulation), and information recording to a DVD is performed by 8–16 modulation. These modulation systems make the spectrum of recording pattern to the disk substantially DC component-free. In order to make use of such characteristics of these modulation systems, a reproduction signal is usually digitized by a digitizing circuit for controlling the slicing level of the signal by performing negative feedback control, so that the duty ratio of the digitized signals is 50:50.

With reference to FIG. 14A, a digitizing circuit 1300 will be described.

An optical pickup circuit 2 outputs a reproduction signal RS obtained from an optical disk 1. The reproduction signal RS is capacitance-coupled by a capacitor C and supplied with a prescribed bias voltage of, for example, VCC/2. The resultant signal is input to a negative (−) input terminal 110A of a comparator 110 and compared with a slicing level which is input to a positive (+) input terminal 110B of the comparator 110. Thus, a digitized signal DG1 is output from the comparator 110.

A charge pump 101 is driven, i.e., the potential of a charge capacitor 102 is increased or decreased, in accordance with the polarity of the digitized signal DG1 output from the comparator 110. A charge voltage stored in the charge capacitor 102 is current-amplified by a buffer 103 and ripple-removed by a low pass filter 104. Then, the resultant signal is input to the positive input terminal 110B of the comparator 110.

For example, when the potential of the negative input terminal 110A is higher than the potential of the positive input terminal 110B, the output level from the comparator 110 is 0. Then, a charge pump 101A is turned on to raise the potential of the charge capacitor 102. Thus, the potential of the positive input terminal 110B of the comparator 110 is raised. In this manner, negative feedback control is performed so that the difference between the potential of the positive input terminal 110B and the potential of the negative input terminal 110A becomes 0.

When the potential of the negative input terminal 110A is lower than the potential of the positive input terminal 110B, a charge pump 101B is turned on to reduce the potential of the charge capacitor 102. Thus, the potential of the positive input terminal 110B of the comparator 110 is lowered. In this manner, negative feedback control is performed so that the difference between the potential of the positive input terminal 110B and the potential of the negative input terminal 110A becomes 0.

FIG. 14B is a waveform diagram of a high frequency reproduction signal RS. When such a high frequency reproduction signal RS in input to the digitizing circuit 1300, a negative feedback digitizing slicing level SL is controlled so that the duty ratio of the "0" level L0 and the "1" level of the digitized signal DG1 output from the digitizing circuit 1300 becomes 50:50.

A response ability of the negative feedback control is determined by the driving current value of the charge pump 101, the capacitance of the charge capacitor 102, and the time constant of the low pass filter 104.

Recently, electric circuits are more and more digitized. An analog reproduction signal from an optical disk is processed by an A/D converter with multiple bits, and then processed by a digital signal processing circuit for reproducing the signal entirely by digital processing. The digital signal processing circuit is generally referred to as a "digital read channel". Use of a digital read channel realizes stable operations by suppressing dispersion among circuits and reduces an error rate by digital signal processing such as, for example, PRML (partial response/most likelihood).

When an optical disk has defects such as dust or scratches, laser light from an optical pickup circuit is blocked by the dust or scratches. Accordingly, the level of the reproduction signal is significantly fluctuated in terms of both direct current or alternate current. In order to accurately digitize the reproduction signal despite such changes, the digitizing circuit 1300 needs to have a higher response ability so as to follow the changes.

However, the spectrum of recording pattern to the optical disk is not completely DC component-free around a defect change frequency (several kilohertz or less). Thus, the cut-off frequency of the low pass filter 104 needs to be raised to improve the response ability of the digitizing circuit 1300. In such a case, a DC fluctuation component of the reproduction signal is mixed into a negative feedback signal, i.e., the signal input to the positive input terminal 110B as an external disturbance. This prevents accurate digitization, and a data slicing error occurs and generation of jitters is increased.

FIG. 15 shows a circuit designed for alleviating the data slicing error. The reproduction signal RS is passed through a high pass filter 105, before being input to the digitizing circuit 1300, to remove a low frequency band fluctuation component, so that the reproduction signal RS has a line of symmetry between the upper half and the lower half even when the signal level is fluctuated by defects. In this manner, the control load performed by the digitizing circuit 1300 is alleviated and thus the data slicing error is alleviated.

However, such a circuit removes the low frequency band fluctuation component in a steady state, i.e., even when there is no defect. Therefore, a data slicing error occurs by the lack of information provided by the low frequency bank fluctuation component and the generation of jitters is increased.

FIG. 16 shows a signal level when a light beam passes through a defect. Since light reflected by the optical disk is not obtained, the level of the reproduction signal RS is lowered to a black level BL. This phenomenon is conspicuous in the case of dual layer DVDs. When performing A/D conversion of the reproduction signal RS, the dynamic range of A/D conversion usually needs to be maximized with respect to an amplitude A of a signal of normal reproduction from the viewpoint of SNR. However, when the signal level is reduced to the black level BL by the dropout, the reproduction signal RS exceeds the dynamic range. This adversely influences the digital signal processing.

SUMMARY OF THE INVENTION

According to one aspect of the invention, a wave-shaping apparatus includes a first detection circuit for detecting a reproduction signal reproduced from an optical disk by an optical pickup circuit using a first detection time constant to detect an upper envelope of the reproduction signal; a second detection circuit for detecting the reproduction signal using a second detection time constant to detect a lower envelope of the reproduction signal; an averaging circuit for putting a weight represented by a weighting coefficient to each of the upper envelope and the lower envelope to calculate an average value of each of the upper envelope and the lower envelope; and a subtraction circuit for subtracting a signal corresponding to the average value from the reproduction signal to output a wave-shaped signal.

In one embodiment of the invention, the wave-shaping apparatus further includes a low pass filter for smoothing the average value to output a smoothing signal. The subtraction circuit subtracts the smoothing signal from the reproduction signal.

In one embodiment of the invention, the weighting coefficient is 1:1.

In one embodiment of the invention, the weighting coefficient is determined based on an asymmetry quantity of the reproduction signal.

In one embodiment of the invention, the wave-shaping apparatus further includes an asymmetry detection circuit for detecting the asymmetry quantity.

In one embodiment of the invention, at least one of the first detection time constant and the second detection time constant is determined to be substantially in proportion to a diameter of a light spot on the optical disk.

In one embodiment of the invention, at least one of the first detection time constant and the second detection time constant is determined to be substantially in inverse proportion to a reproduction linear velocity of the optical disk.

In one embodiment of the invention, a cutoff frequency of the low pass filter is determined to be substantially in inverse proportion to a diameter of a light spot on the optical disk.

In one embodiment of the invention, a cutoff frequency of the low pass filter is determined to be substantially in proportion to a reproduction linear velocity of the optical disk.

In one embodiment of the invention, the wave-shaping apparatus further includes a dropout detection circuit for detecting a dropout indicating a decrease in an amplitude of the reproduction signal, wherein when the dropout is detected by the dropout detection circuit, at least one of the first detection time constant and the second detection time constant is set to be shorter than the time constant when no dropout is detected.

In one embodiment of the invention, the wave-shaping apparatus further includes a dropout detection circuit for detecting a dropout indicating a decrease in an amplitude of the reproduction signal, wherein when the dropout is detected by the dropout detection circuit, the cutoff frequency of the low pass filter is set to be higher than the time constant when no dropout is detected.

According to another aspect of the invention, a reproduction signal processing apparatus includes a wave-shaping apparatus which includes a first detection circuit for detecting a reproduction signal reproduced from an optical disk by an optical pickup circuit using a first detection time constant to detect an upper envelope of the reproduction signal, a second detection circuit for detecting the reproduction signal using a second detection time constant to detect a lower envelope of the reproduction signal, an averaging circuit for putting a weight represented by a weighting coefficient to each of the upper envelope and the lower envelope to calculate an average value of the upper envelope and the lower envelope, and a subtraction circuit for subtracting a signal corresponding to the average value from the reproduction signal to output a wave-shaped signal; and a digitizing circuit for digitizing the wave-shaped signal to output a digitized signal.

According to still another aspect of the invention, a reproduction signal processing apparatus includes a wave-shaping apparatus which includes a first detection circuit for detecting a reproduction signal reproduced from an optical disk by an optical pickup circuit using a first detection time constant to detect an upper envelope of the reproduction signal, a second detection circuit for detecting the reproduction signal using a second detection time constant to detect a lower envelope of the reproduction signal, an averaging circuit for putting a weight represented by a weighting coefficient to each of the upper envelope and the lower envelope to calculate an average value of the upper envelope and the lower envelope, and a subtraction circuit for subtracting a signal corresponding to the average value from the reproduction signal to output a wave-shaped signal; and an analog/digital converter for performing analog/digital conversion of the wave-shaped signal.

In one embodiment of the invention, the reproduction signal processing circuit further includes a digital signal processing circuit for performing digital signal processing of an output from the analog/digital converter to output reproduction data and a reproduction clock.

According to one aspect of the invention, the fluctuation of a reproduction signal caused when an optical disk has a defect is suppressed. Thus, the control load of a digitizing circuit is significantly alleviated. As a result, data slicing errors are significantly reduced without increasing the jitters in a steady-state reproduction.

According to another aspect of the invention, the control load of a digitizing circuit is significantly alleviated and data slicing errors are significantly reduced without increasing the jitters in a steady-state reproduction with a relatively simple structure.

According to still another aspect of the invention, the weighting coefficient provided to upper and lower envelopes used by an averaging circuit for calculating an average value thereof is determined to be substantially in proportion to an asymmetry quantity of the reproduction signal. Therefore, the control load of a digitizing circuit is significantly alleviated regardless of whether the writing conditions of data to the optical disk (e.g., the diameter of the light spot), and data slicing errors are significantly reduced without increasing the jitters in a steady-state reproduction.

According to still another aspect of the invention, wave-shaping is optimally performed based on the diameter of the light spot in the optical disk. Thus, data slicing errors are significantly reduced without increasing the jitters in a steady-state reproduction.

According to still another aspect of the invention, wave-shaping is optimally performed based on the reproduction linear velocity of the optical disk. Thus, data slicing errors are significantly reduced without increasing the jitters in a steady-state reproduction.

According to still another aspect of the invention, the wave-shaping performance when the optical disk has a defect is improved while and the generation of jitters when the optical disk has no defect is not deteriorated.

Thus, the invention described herein makes possible the advantage of providing (1) a wave-shaping apparatus for alleviating the load of a digitizing circuit and significantly decreasing the generation of jitters, and a reproduction signal processing apparatus including such a wave-shaping apparatus; (2) a wave-shaping apparatus for accurately digitizing a reproduction signal even when the level of the reproduction signal obtained from an optical disk significantly fluctuates by a defect on the optical disk as well as when the optical disk has no defect, and a reproduction signal processing apparatus including such a wave-shaping apparatus; (3) a wave-shaping apparatus for making maximum use of the dynamic range of an A/D converter, and a reproduction signal processing apparatus including such a wave-shaping apparatus; and (4) a wave-shaping apparatus for improving the stability of the digital signal processing circuit, and a reproduction signal processing apparatus including such a wave-shaping apparatus.

These and other advantages of the present invention will become apparent to those skilled in the art upon reading and understanding the following detailed description with reference to the accompanying figures.

BRIEF DESCRIPTION OF THE DRAWINGS

FIG. 14B is a diagram illustrating a high frequency reproduction signal input to the digitizing circuit;

FIG. 16 is a diagram illustrating a reproduction signal obtained by the conventional wave-shaping apparatus shown in FIG. 15 when a light beam passes a defect of an optical disk.

DESCRIPTION OF THE PREFERRED EMBODIMENTS

Hereinafter, the present invention will be described by way of illustrative examples with reference to the accompanying drawings.

EXAMPLE 1

Figure 1:
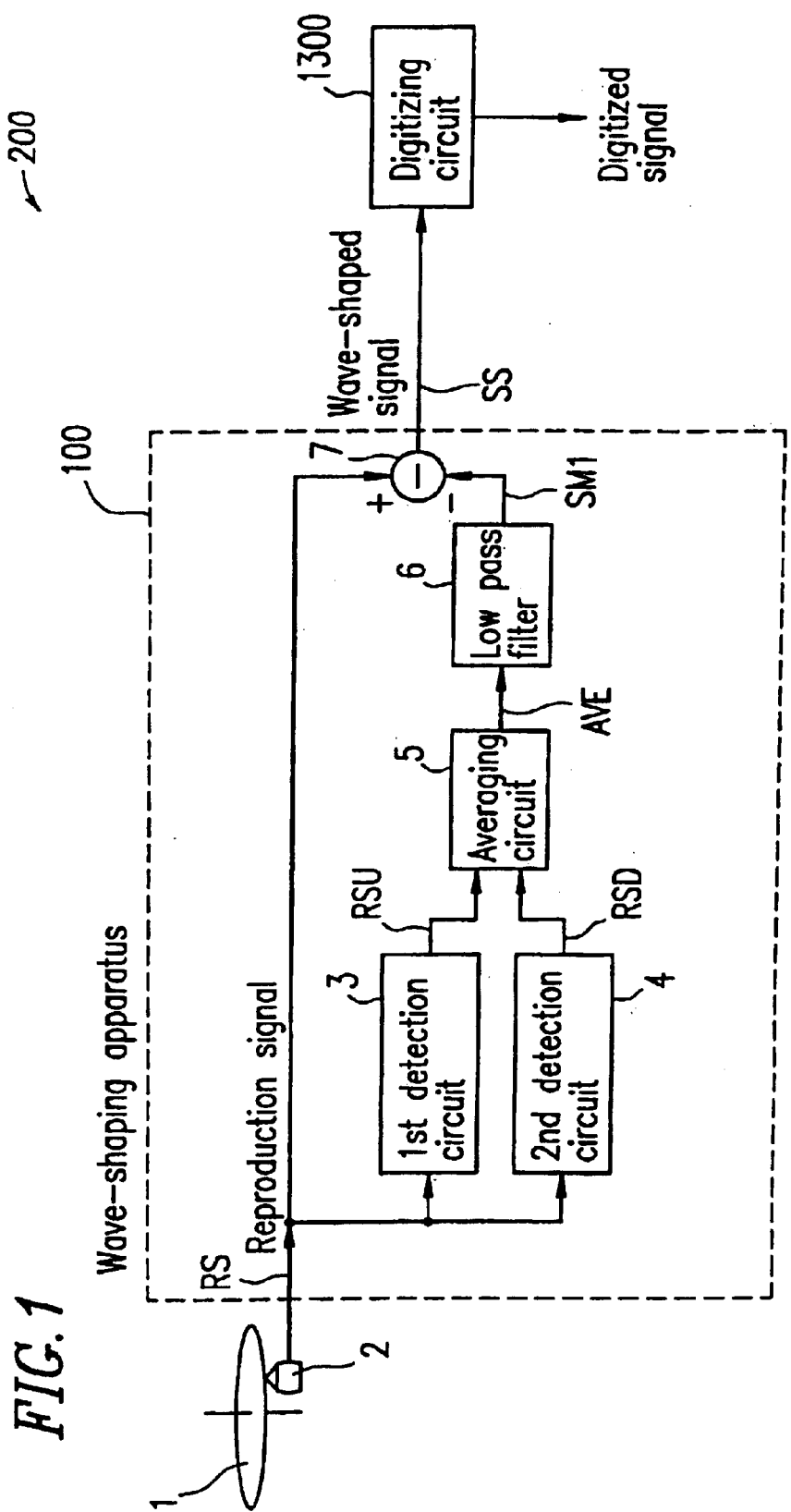
FIG. 1 is a block diagram illustrating a structure of a reproduction signal processing apparatus in a first example according to the present invention.

A reproduction signal processing apparatus 200 in a first example according to the present invention will be described with reference to FIG. 1. FIG. 1 is a block diagram of the reproduction signal processing apparatus 200. As shown in FIG. 1, the reproduction signal processing apparatus 200 includes a wave-shaping apparatus 100 and a digitizing circuit 1300.

A signal recorded on an optical disk 1 is reproduced by an optical pickup circuit 2 as a reproduction signal RS.

The wave-shaping apparatus 100 includes a first detection circuit 3 for detecting the reproduction signal RS from the optical pickup circuit 2 at a prescribed time constant and thus detecting an upper envelope RSU, a second detection circuit 4 for detecting the reproduction signal RS from the optical pickup circuit 2 at a prescribed time constant and thus detecting a lower envelope RSD, an averaging circuit 5 for finding an average value AVE of the upper envelope RSU and the lower envelope RSD, a low pass filter 6 for smoothing the AVE obtained by the averaging circuit 5 to output a smoothing signal SM1, and a subtraction circuit 7 for subtracting the smoothing signal SM1 from the reproduction signal RS to output a wave-shaped signal SS. The digitizing circuit 1300 digitizes the wave-shaped signal SS to output a digitized signal.

With reference to FIGS. 2A through 2D, an exemplary operation of the wave-shaping apparatus 100 will be described.

As described above, a signal stored in the optical disk 1 (FIG. 1) is read by the optical pickup circuit 2 as a reproduction signal RS. When the optical disk 1 has a defect such as, for example, a scratch, the reproduction signal RS includes a disturbance D1 as shown in FIG. 2A.

When the reproduction signal RS is directly input to the digitizing circuit 1300, the reproduction signal RS is digitized with a negative feedback digitized slicing level SL1, which follows an average value of the upper envelope RSU and the lower envelope RSD or the vicinity thereof. However, when the disturbance D1 caused by a defect has an excessively short cycle, the negative feedback digitizing slicing level SL1 cannot appropriately follow the disturbance D1, resulting in a slicing error.

In order to avoid such an inconvenience, the reproduction signal processing apparatus 200 includes the above-described elements and operates as follows.

Figure 2A:
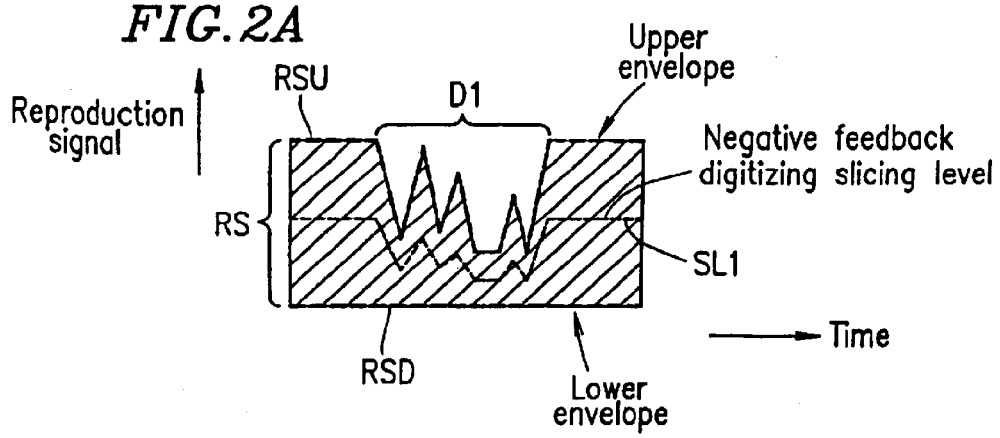
FIG. 2A is a diagram illustrating an exemplary waveform of a reproduction signal obtained from an optical disk having a defect.

Referring to FIG. 2A, the first detection circuit 3 (FIG. 1) detects the reproduction signal RS from the optical pickup circuit 2 and detects the upper envelope RSU. The second detection circuit 4 (FIG. 1) detects the reproduction signal RS from the optical pickup circuit 2 and detects the lower envelope RSD.

Figure 2B:
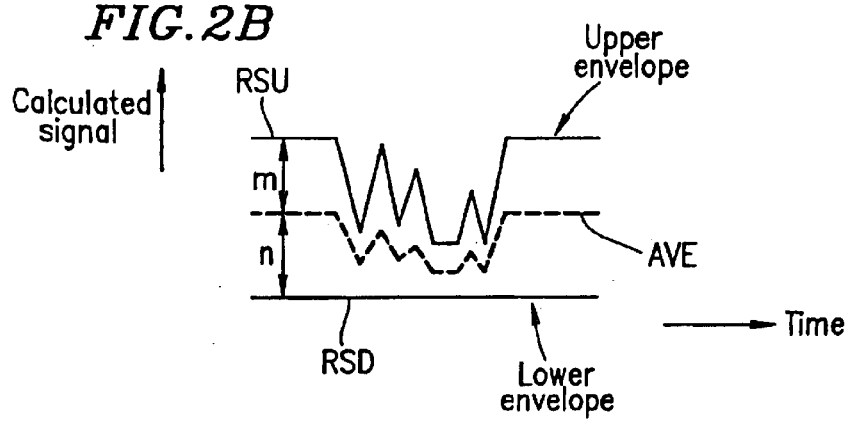
FIG. 2B is a diagram illustrating an average value obtained by performing weighting to the waveform shown in FIG. 2A.

Referring to FIG. 2B, the averaging circuit 5 puts a weight represented by a weighting coefficient M:N to the upper envelope RSU and the lower envelope RSD to calculate the average value AVE.

Figure 2C:
FIG. 2C is a diagram illustrating a fluctuation component included in the reproduction signal shown in FIG. 2A.

Referring to FIG. 2C, the low pass filter 6 removes a noise component included in the average value AVE and extracts a hazardous DC fluctuation component included in the reproduction signal RS obtained when the optical disk (FIG. 1) has a defect. The signal containing substantially only the extracted component is output as a smoothing signal SM1.

Figure 2D:
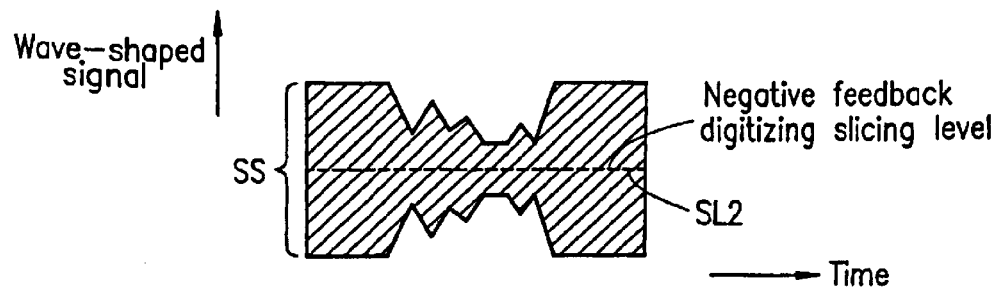
FIG. 2D is a diagram illustrating a waveform obtained by wave-shaping the reproduction signal shown in FIG. 2A.

Referring to FIG. 2D, the subtraction circuit 7 subtracts the smoothing signal SM1 from the reproduction signal RS to output a wave-shaped signal SS which has a lines of symmetry between the upper half and the lower half.

Figure 3:
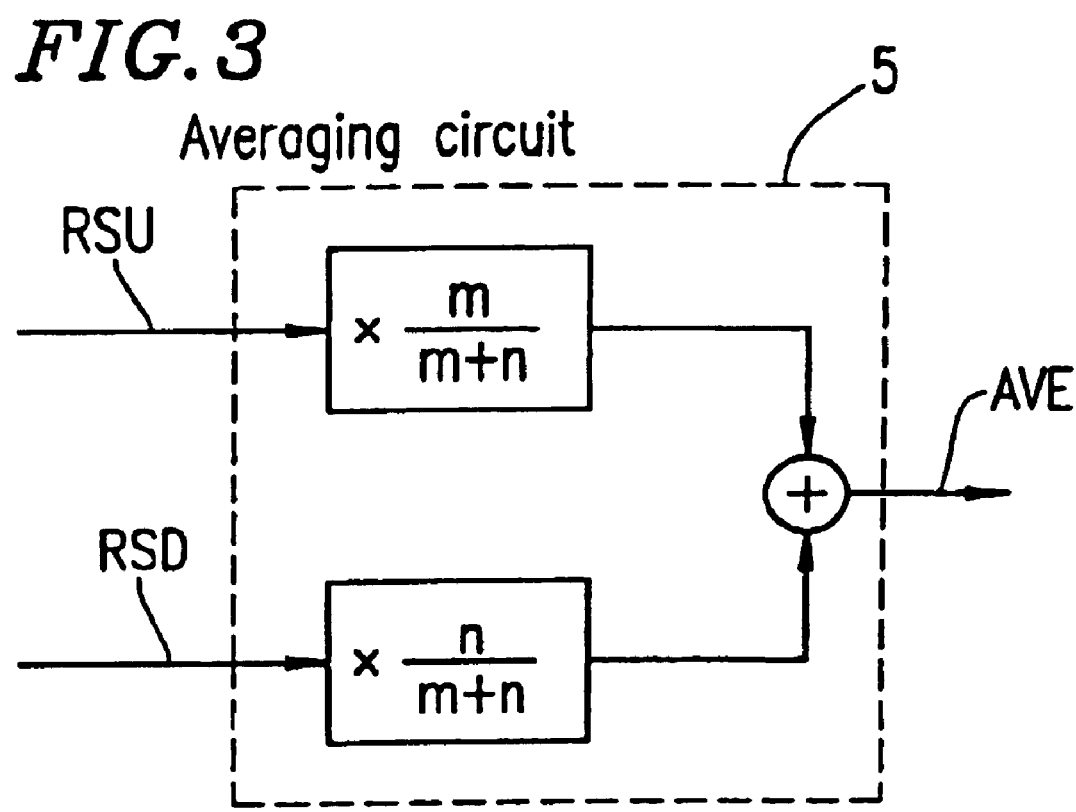
FIG. 3 is a block diagram illustrating an exemplary structure of an averaging circuit shown in FIG. 1.

When the wave-shaped signal SS obtained as a result of such pre-processing is input to the digitizing circuit 1300, the wave-shaped signal SS is digitized with a negative feedback digitizing slicing level SL2. The negative feedback digitizing slicing level SL2 does not substantially fluctuate even when the disturbance D1 caused by the defect has an excessively short cycle and can appropriately follow the disturbance D1. Thus, slicing errors are significantly reduced. FIG. 3 shows an exemplary structure of the averaging circuit 5. As shown in FIG. 3, the averaging circuit 5 can be realized by a simple structure.

Figure 4A:
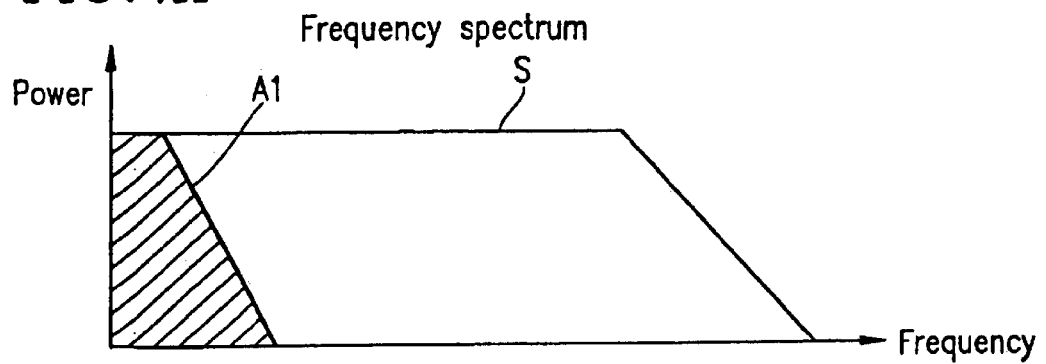
FIG. 4A is a diagram illustrating a frequency spectrum of a reproduction signal without being wave-shaped.
Figure 4B:
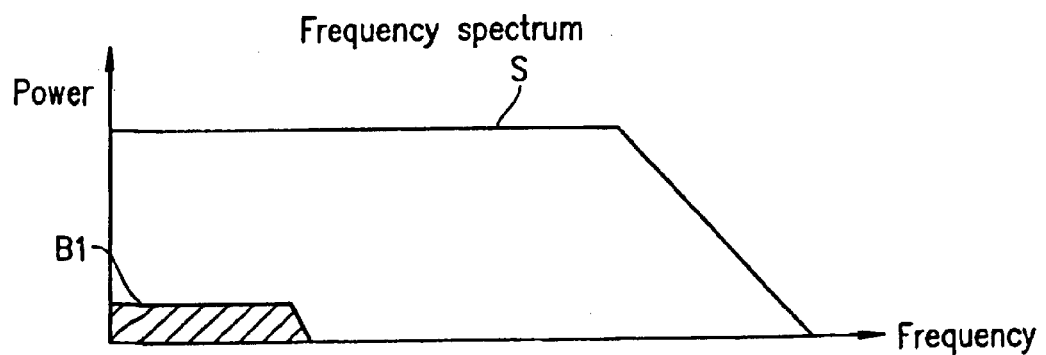
FIG. 4B is a diagram illustrating a frequency spectrum of a reproduction signal obtained by the reproduction signal processing apparatus shown in FIG. 1.

With reference to FIGS. 4A and 4B, a frequency spectrum of the reproduction signal RS will be described.

Figure 15:
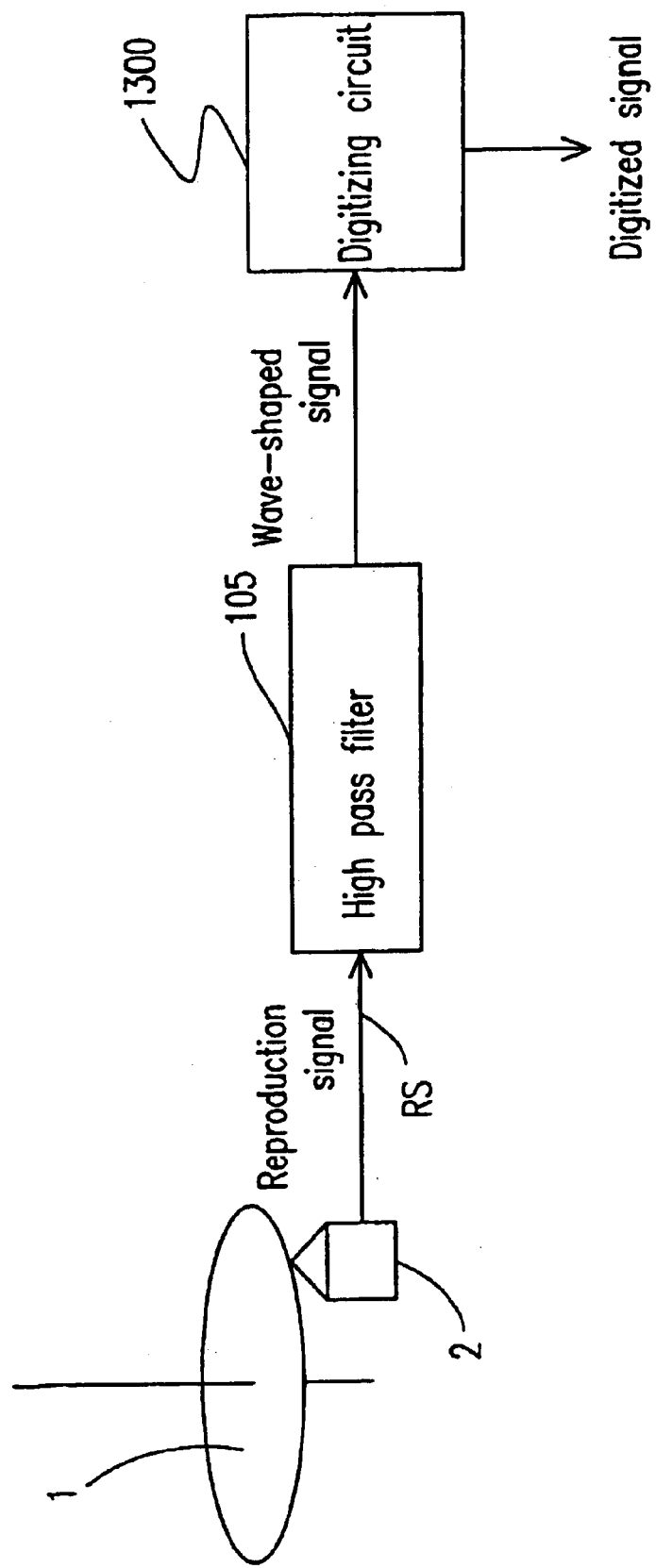
FIG. 15 is a block diagram illustrating a structure of a conventional wave-shaping apparatus.

FIG. 4A shows the frequency spectrum obtained when the reproduction signal RS is processed using a high pass filter 105 described with reference to FIG. 15. As shown in FIG. 4A, a component represented by area A1 is removed from the reproduction signal RS represented by area S by the high pass filter 105. Generation of jitters caused by the lack of the component represented by area A1 is increased.

Figure 5:
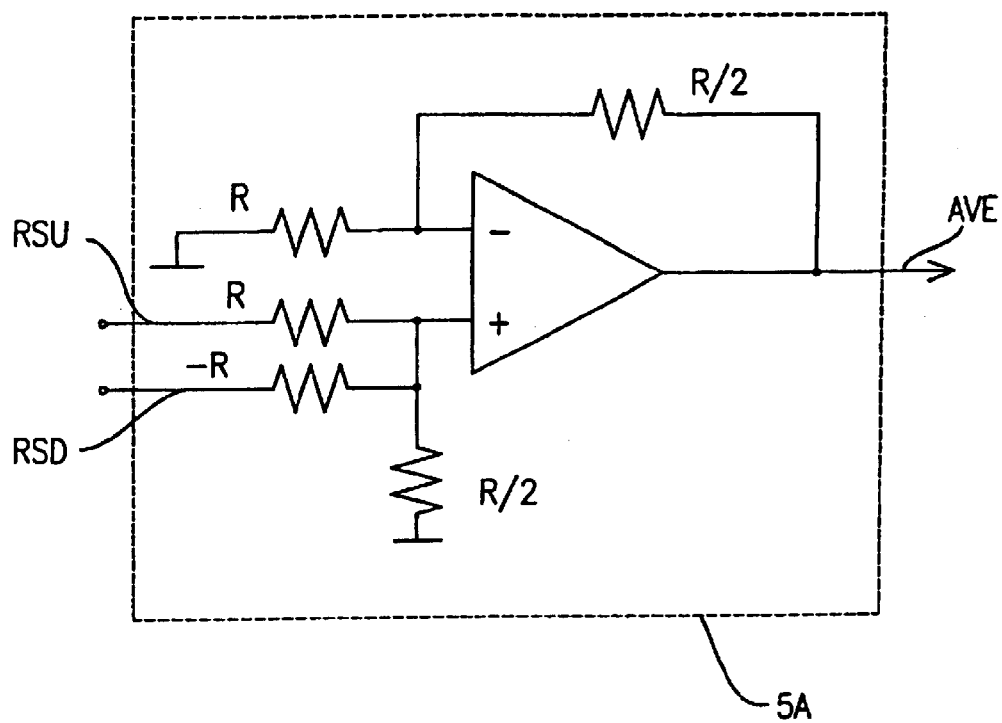
FIG. 5 is a block diagram illustrating an exemplary structure of the average structure shown in FIG. 1 when a weighting coefficient is 1:1.

FIG. 4B shows the frequency spectrum obtained when the reproduction signal RS is processed by the reproduction signal processing apparatus 200. As shown in FIG. 4B, a component represented by an area as small as area B1 is removed from the reproduction signal RS. Thus, the generation of jitters can be minimized. As a result, the slicing performance obtained when the light beam passes through the defect of the optical disk 1 (FIG. 1) is improved while the generation of jitters when the optical disk 1 has no defect is not deteriorated.

Where the weight coefficient M:N provided by the averaging circuit 5 to the upper and lower envelopes for finding the average value AVE is 1:1, an averaging circuit having a simple structure is obtained. Such an average circuit 5A is shown in FIG. 5.

EXAMPLE 2

Figure 6:
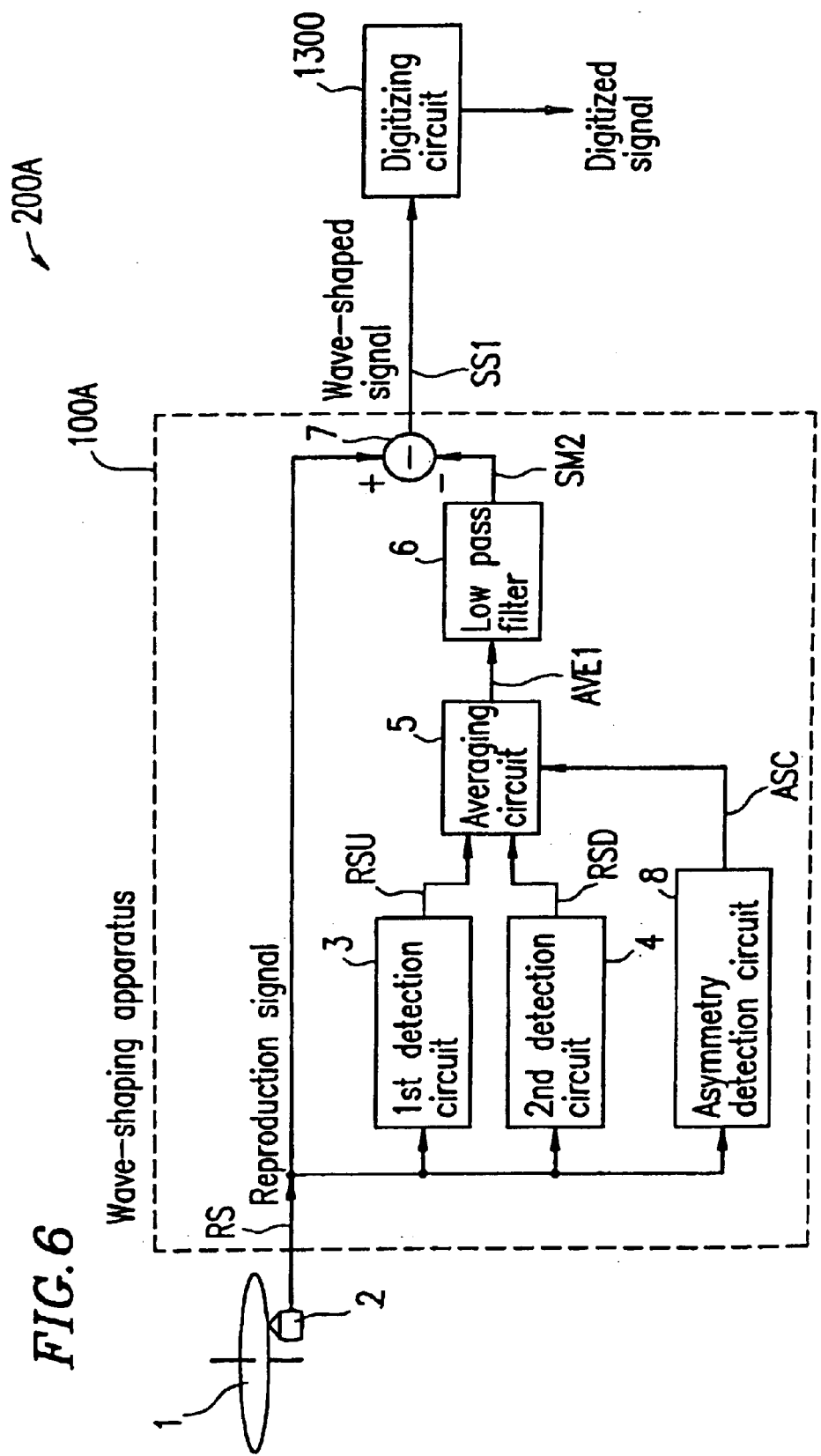
FIG. 6 is a block diagram illustrating a structure of a reproduction signal processing apparatus in a second example according to the present invention.

FIG. 6 is a block diagram of a reproduction signal processing apparatus 200A in a second example according to the present invention. Identical elements previously discussed with respect to FIG. 1 bear identical reference numerals and the descriptions thereof will be omitted. The reproduction signal processing apparatus 200A includes a wave-shaping apparatus 100A and the digitizing circuit 1300.

The wave-shaping apparatus 100A includes an asymmetry detection circuit 8 in addition to the elements shown in FIG. 1. The weighting coefficient M:N to the upper and lower envelopes used by the averaging circuit 5 for calculating the average value AVE is determined to be substantially in proportion to an asymmetry quantity of the reproduction signal RS.

Asymmetry is usually generated under certain disc cutting conditions or recording conditions. When a recording pit tends to be written to be larger than a prescribed reference pit, the negative feedback digitizing slicing level to realize a post-digitization duty ratio of 50:50 is offset upward (or downward) from an intermediate level of the reproduction signal. When a recording pit tends to be written to be smaller than the prescribed reference pit, the negative feedback digitizing slicing level to realize a post-digitization duty ratio of 50:50 is offset downward (or upward) from the intermediate level. The offset amount of the negative feedback digitizing slicing level relative to the intermediate level of the reproduction signal RS is referred to as the "asymmetry quantity".

With reference to FIGS. 7A through 7D, a frequency spectrum of the reproduction signal RS will be described.

Figure 7A:
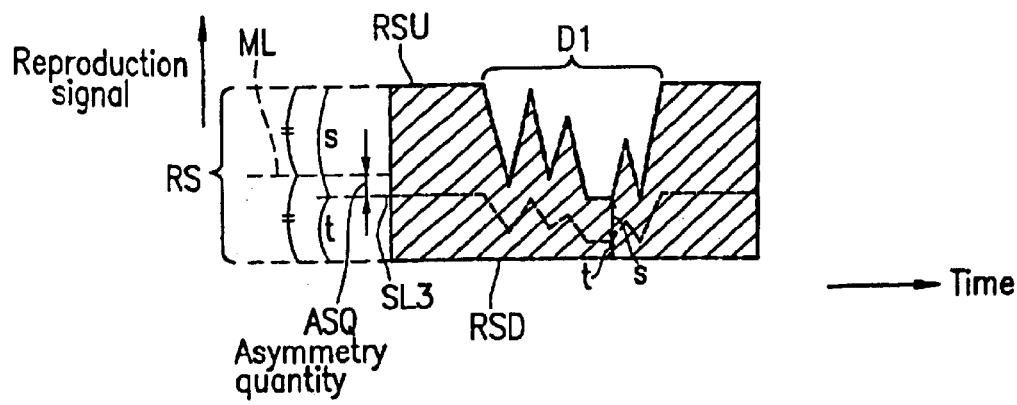
FIG. 7A is a diagram illustrating an exemplary waveform of a reproduction signal obtained when asymmetry occurs.

FIG. 7A shows the frequency spectrum obtained when the asymmetry occurs. As shown in FIG. 7A, a negative feedback digitizing slicing level SL3 is offset from an intermediate level ML by an asymmetry quantity ASQ. The ratio S:T, i.e., the ratio of (i) the distance between negative feedback digitizing slicing level SL3 and the upper envelope RSU and (ii) the distance between negative feedback digitizing slicing level SL3 and the lower envelope RSD is referred to as an "asymmetry coefficient ASC".

In a period corresponding to the disturbance D1 caused by a defect, the negative feedback digitizing slicing level SL3 fluctuates while maintaining the asymmetry coefficient ASC=S:T. However, in a period where the disturbance D1 has an excessively short cycle, the negative feedback digitizing slicing level SL3 cannot appropriately follow the disturbance D1, resulting in a slicing error.

In order to avoid such an inconvenience, the reproduction signal processing apparatus 200A includes the above-described elements and operates as follows.

Figure 7B:
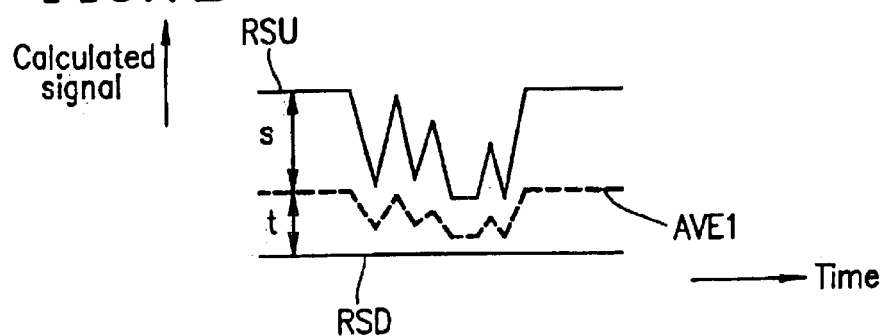
FIG. 7B is a diagram illustrating an average value obtained by performing weighting to the waveform shown in FIG. 7A.

Referring to FIG. 7B, the averaging circuit 5 sets a weighting coefficient M:N to the upper envelope RSU and the lower envelope RSD used for calculating an average value AVE1 at the asymmetry coefficient ASC (S:T) which is output from the asymmetry detection circuit 8, and puts a weight represented by the asymmetry coefficient ASC (S:T) to each of the upper envelope RSU and the lower envelope RSD to calculate the average value AVE1.

Figure 7C:
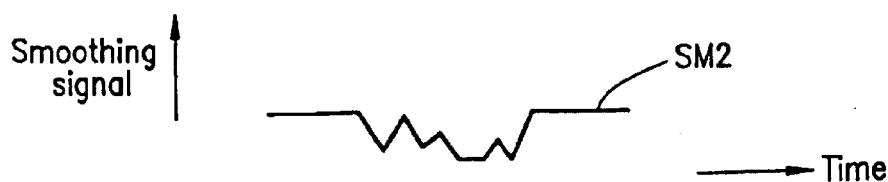
FIG. 7C is a diagram illustrating a fluctuation component included in the reproduction signal shown in FIG. 7A.
Figure 7D:
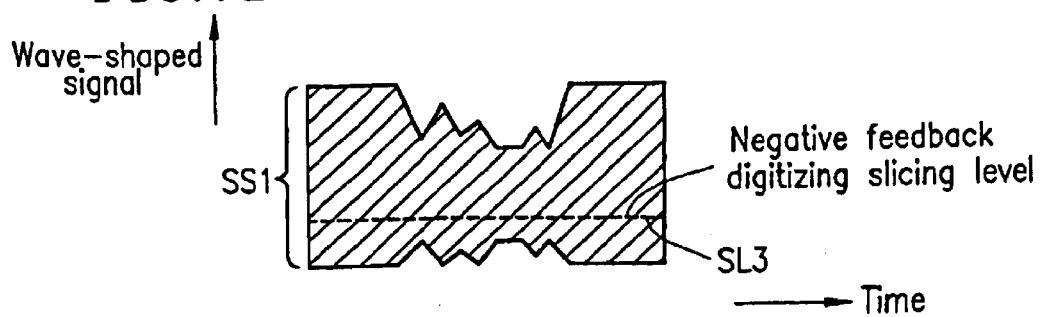
FIG. 7D is a diagram illustrating a waveform obtained by wave-shaping the reproduction signal shown in FIG. 7A.

Referring to FIG. 7C, the low pass filter 6 removes a noise component included in the average value AVE1 and outputs a smoothing signal SM2. Referring to FIG. 7D, the subtraction circuit 7 subtracts the smoothing signal SM2 from the reproduction signal RS to output a wave-shaped signal SS1.

Where the weighting coefficient M:N is set at the asymmetry coefficient ASC (S:T), the fluctuation of the negative feedback digitizing slicing level SL3 is minimized as shown in FIG. 7D. Thus, the slicing performance when the light beam passes through the defect of the optical disk 1 (FIG. 1) is further improved.

The weighting coefficient M:N can also be 1:1 when the asymmetry occurs. With such setting, the fluctuation of the negative feedback digitizing slicing level SL3 is within a range causing no practical problem, although the fluctuation is slightly larger as compared with when the weighting coefficient M:N is set at the asymmetry coefficient.

Figure 8:
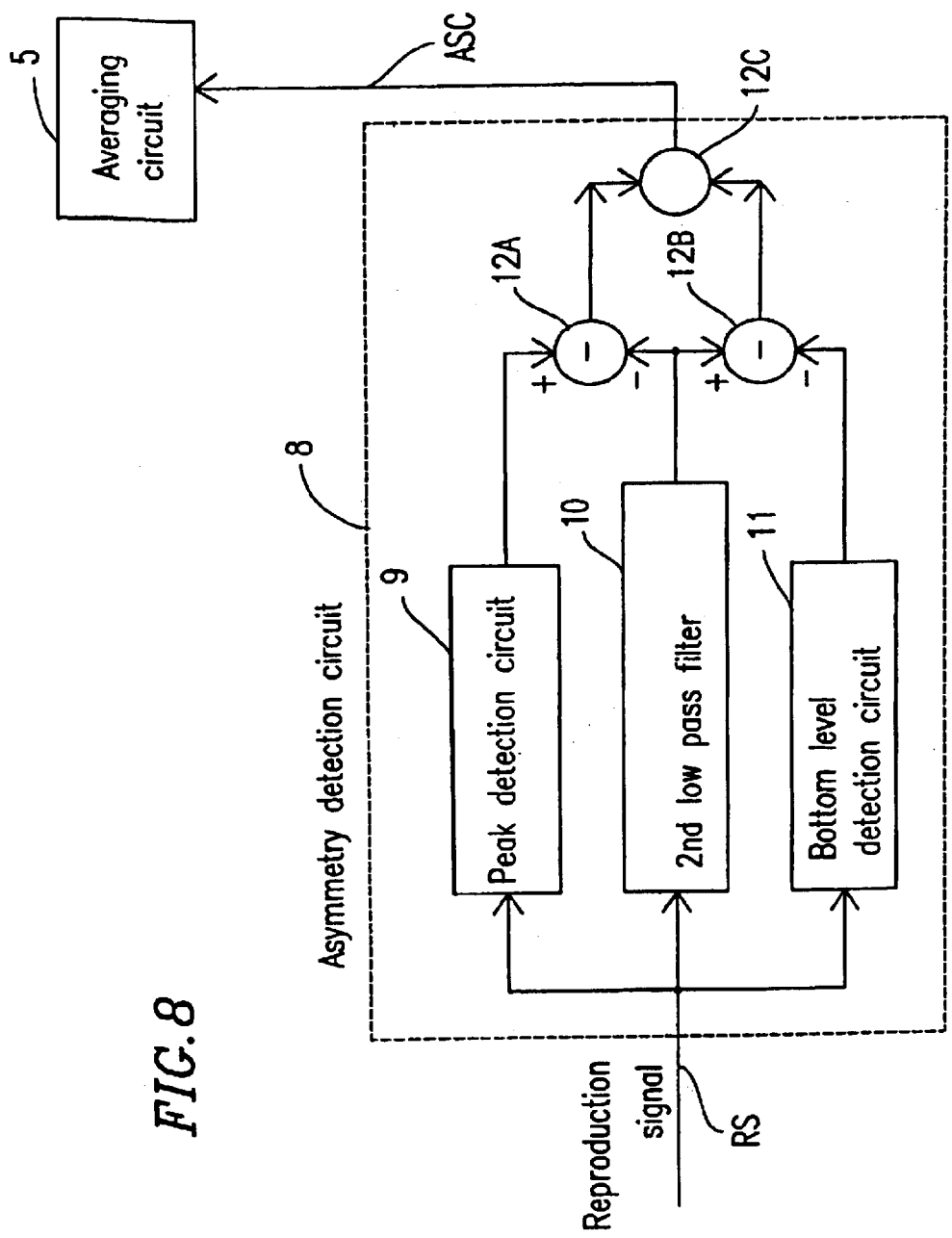
FIG. 8 is a block diagram illustrating a structure of an asymmetry detection circuit shown in FIG. 6.

FIG. 8 shows an exemplary structure of the asymmetry detection circuit 8. The asymmetry detection circuit 8 includes a peak detection circuit 9 for detecting a peak of the reproduction signal RS, a second low pass filter 10 for detecting a DC level of the reproduction signal RS, a bottom level detection circuit 11 for detecting a bottom level of the reproduction signal RS, second subtraction circuits 12A and 12B, and an asymmetry coefficient calculation circuit 12C. The asymmetry coefficient calculation circuit 12C calculates the asymmetry coefficient ASC (S:T) based on the difference between the output from the peak detection circuit 9 and the output from the second low pass filter 10 and the difference between the output from the second low pass filter 10 and the bottom level detection circuit 11.

At least one of a first detection time constant used by the first detection circuit 3 and a second detection time constant used by the second detection circuit 4 is determined to be substantially in proportion to the diameter of a light spot on the optical disk 1 (FIG. 1).

Figure 9A:
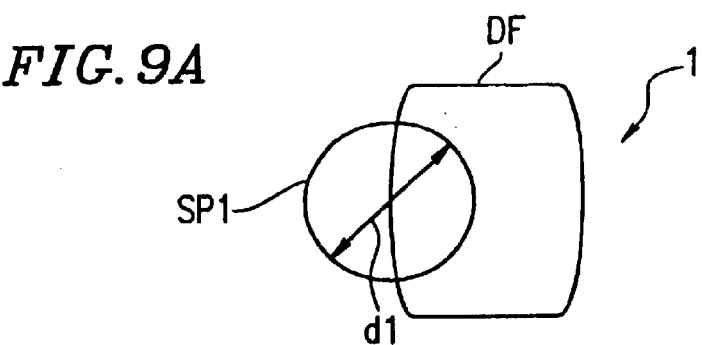
FIG. 9A is a diagram illustrating a light spot having a relatively large diameter passing through a detect on an optical disk.
Figure 9B:
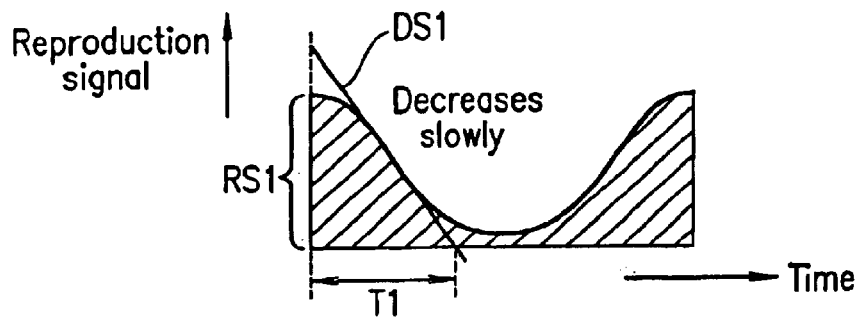
FIG. 9B is a diagram illustrating a decrease in the level of the reproduction signal when the light spot shown in FIG. 9A passes through the detect.
Figure 9C:
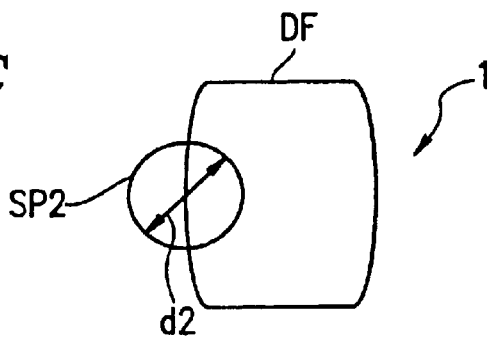
FIG. 9C is a diagram illustrating a light spot having a relatively small diameter passing through a detect on an optical disk.
Figure 9D:
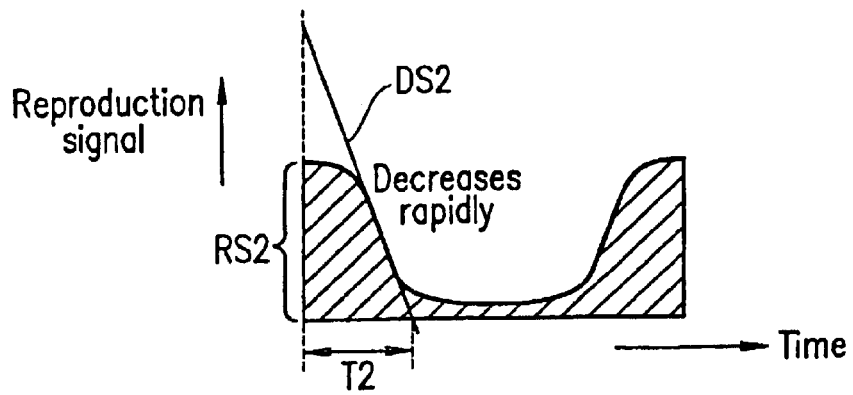
FIG. 9D is a diagram illustrating a decrease in the level of the reproduction signal when the light spot shown in FIG. 9C passes through the detect.

FIGS. 9A and 9C respectively show light spots SP1 and SP2 having diameters d1 and d2 passing through a defect DF on the optical disk 1. In FIGS. 9A and 9C, the size of the defect DF is the same. FIGS. 9B and 9D respectively show the fluctuation of the reproduction signal RS in the states shown in FIGS. 9A and 9C.

The diameter d1 of the light spot SP1 is n times the diameter d2 of the light spot SP2 (n>1). When the diameter d1 is n times the diameter d2, the decreasing rate of the level of the reproduction signal RS (represented as RS1) in FIG. 9B is 1/n times the decreasing rate of the level of the reproduction signal RS (represented as RS2) in FIG. 9D. Thus, the level of reproduction signal RS1 decreases more slowly than the reproduction signal RS2.

The first detection circuit 3 detects the reproduction signals RS1 and RS2 using detection signals DS1 and DS2, respectively. A detection time constant T1 of the detection signal DS1 is determined to be n times a detection time constant T2 of the detection signal DS2. As can be appreciated from this, the detection time constant used by the first detection circuit 3 is determined to be substantially in proportion to the diameter of the light spot. The detection time constant used by the second detection circuit 4 is also determined to be substantially in proportion to the diameter of the light spot.

The detection time constants T1 and T2 are determined so as to detect a decrease in the level of the reproduction signals RS1 and RS2. Therefore, the detection time constants T1 and T2 can be determined to be short so long as the slopes of the detection signals DS1 and DS2 shown in FIGS. 9B and 9D are obtained.

It should be noted that when the detection time constant is determined to be excessively short so that a rapidly decreasing reproduction signal level is detected, unnecessary noise is picked up. Accordingly, the detection time constant is determined to be appropriate in consideration of the dimensions of the light spot.

It is preferable to determine the detection time constant to be substantially in proportion to the diameter of the light spot. In this case, the slicing performance obtained when the light beam passes through the defect of the optical disk 1 (FIG. 1) is improved while the generation of jitters when the optical disk 1 has no defect is not deteriorated without picking up the unnecessary noise.

Figure 10A:
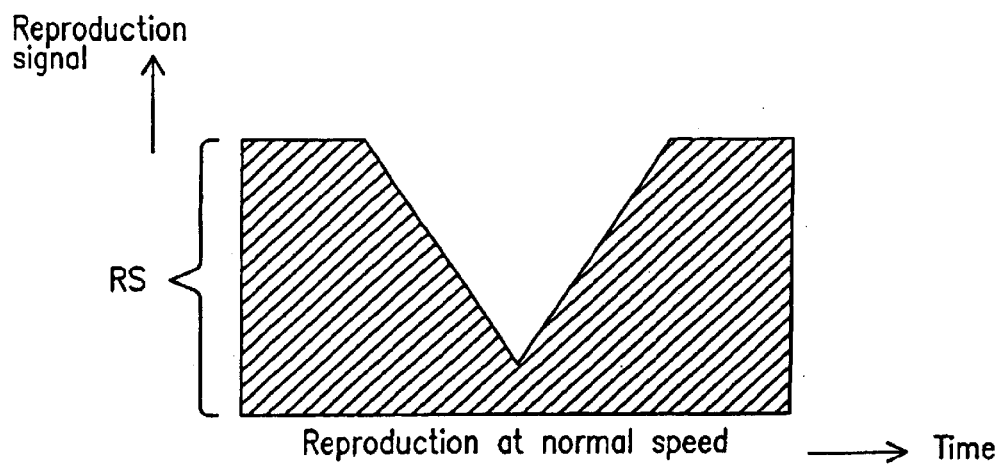
FIG. 10A is a diagram illustrating a fluctuation of the reproduction signal when the reproduction linear velocity of the optical disk is normal.
Figure 10B:
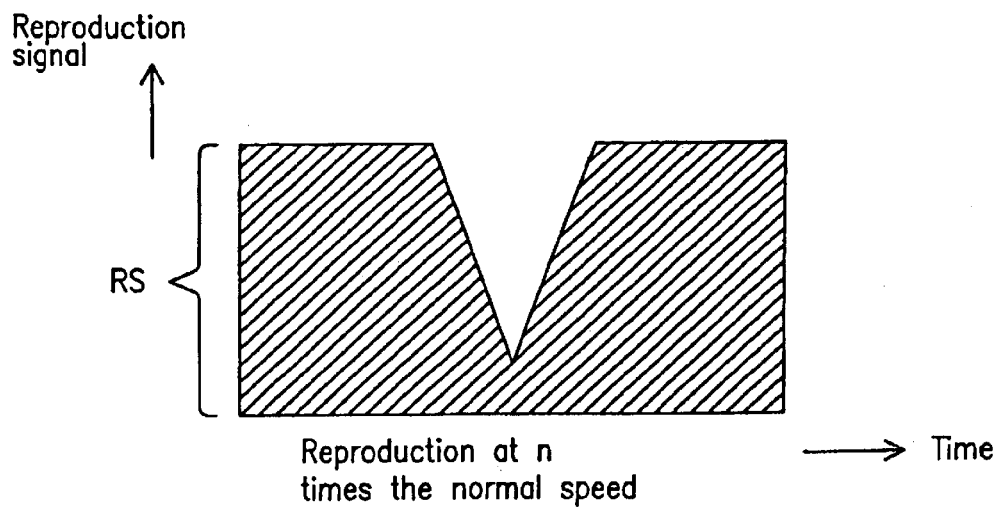
FIG. 10B is a diagram illustrating a fluctuation of the reproduction signal when the reproduction linear velocity of the optical disk is higher than the normal linear velocity.

The detection time constant used by the first detection circuit 3 or the second detection circuit 4 can be determined so as to be substantially in inverse proportion to the reproduction linear velocity. FIGS. 10A and 10B show fluctuations of the reproduction signal RS when the light beam passes through the defect of the optical disk 1 (FIG. 1), with different linear velocities of the same defect. FIG. 10A shows the fluctuation when the optical disk 1 is reproduced at the normal speed, and FIG. 10B shows the fluctuation when the optical disk 1 is reproduced at the speed of n times the normal speed.

As can be appreciated from the comparison between FIG. 10A and FIG. 10B, when the linear velocity is n times higher, the decreasing rate of the level of the reproduction signal RS is also n times higher, and accordingly the optimum detection time constant is 1/n. In this manner, the detection time constant is determined to be substantially in inverse proportion to the reproduction linear velocity.

The cutoff frequency of the low pass filter 6 can be determined to be substantially in inverse proportion to the diameter of the light spot on the optical disk 1 (FIGS. 9A and 9C). As shown in FIGS. 9A and 9B, when the diameter of the light spot is n times larger, the decreasing rate of the level of the reproduction signal RS is 1/n. When the diameter of the light spot is 1/n, the decreasing rate of the level of the reproduction signal RS is n times higher.

When the decreasing rate of the level of the reproduction signal RS is n times higher, the frequency of the hazardous DC fluctuation component (FIG. 7C) included in the smoothing signal SM2 becomes n times higher. In order to allow the fluctuation component having the frequency of n times higher to pass through the low pass filter 6, the cutoff frequency of the low pass filter 6 needs to be set at n times higher.

Accordingly, when the diameter of the light spot is 1/n, the cutoff frequency of the low pass filter 6 is set at n times higher. In this manner, the cutoff frequency of the low pass filter 6 is determined to be substantially in inverse proportion to the diameter of the light spot.

In this case, the slicing performance obtained when the light beam passes through the defect of the optical disk 1 (FIG. 1) is improved while the generation of jitters when the optical disk 1 has no defect is not deteriorated.

The cutoff frequency of the low pass filter 6 can be determined to be substantially in proportion to the reproduction linear velocity. As shown in FIG. 10B, when the reproduction linear velocity is n times higher, the decreasing rate of the level of the reproduction signal RS obtained when the light beam passes through the defect of the optical disk 1 is also n times higher.

When the decreasing rate of the level of the reproduction signal RS is n times higher, the frequency of the hazardous DC fluctuation component (FIG. 7C) included in the smoothing signal SM2 becomes n times higher. In order to allow the fluctuation component having the frequency of n times higher to pass through the low pass filter 6, the cutoff frequency of the low pass filter 6 needs to be set at n times higher.

Accordingly, when the reproduction linear velocity is n times higher, the cutoff frequency of the low pass filter 6 is set at n times higher. In this manner, the cutoff frequency of the low pass filter 6 is determined to be substantially in proportion to the reproduction linear velocity.

In this case, the slicing performance obtained when the light beam passes through the defect of the optical disk 1 (FIG. 1) is improved while the generation of jitters when the optical disk 1 has no defect is not deteriorated.

EXAMPLE 3

Figure 11:
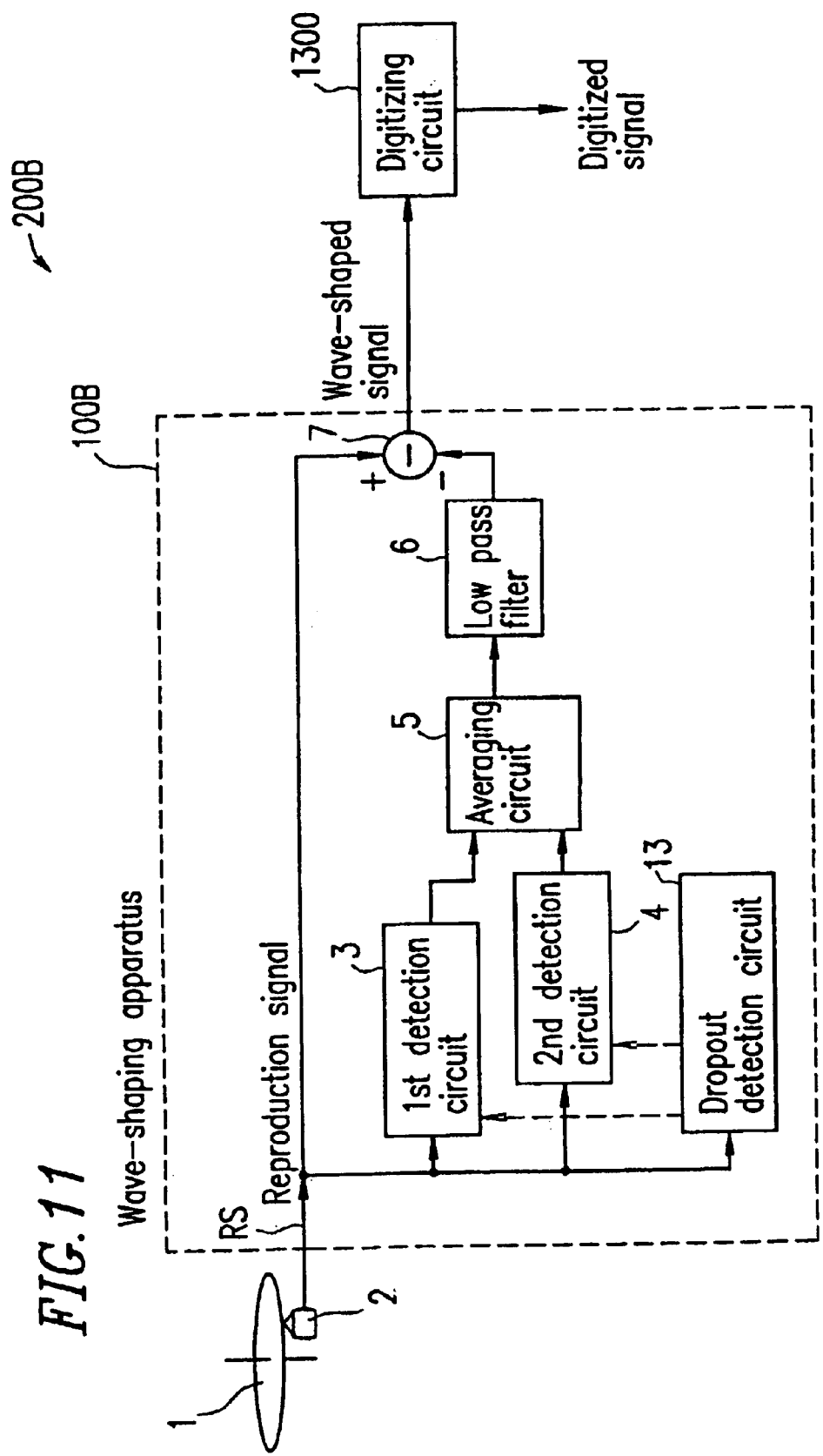
FIG. 11 is a block diagram illustrating a structure of a reproduction signal processing apparatus in a third example according to the present invention.

FIG. 11 is a block diagram of a reproduction signal processing apparatus 200B in a third example according to the present invention. Identical elements previously discussed with respect to FIG. 1 bear identical reference numerals and the descriptions thereof will be omitted. The reproduction signal processing apparatus 200B includes a wave-shaping apparatus 100B and the digitizing circuit 1300.

The wave-shaping apparatus 100B includes a dropout detection circuit 13 for detecting a dropout indicating a decrease in the amplitude of the reproduction signal RS in addition to the elements shown in FIG. 1.

When the dropout detection circuit 13 detects a dropout, at least one of the first detection time constant used by the first detection circuit 3 and the second detection time constant used by the second detection circuit 4 is determined to be shorter than the time constant when no dropout is detected. Accordingly, when a dropout is detected, a negative feedback digitizing slicing level can follow a disturbance more accurately in a period corresponding to the disturbance caused by a defect. When no dropout is detected (normal reproduction), the noise or the like generated in the first or second detection circuit 3 or 4 is suppressed. Accordingly, the slicing performance obtained when the light beam passes through the defect of the optical disk 1 (FIG. 1) is improved while the generation of jitters when the optical disk 1 has no defect is not deteriorated.

Figure 12:
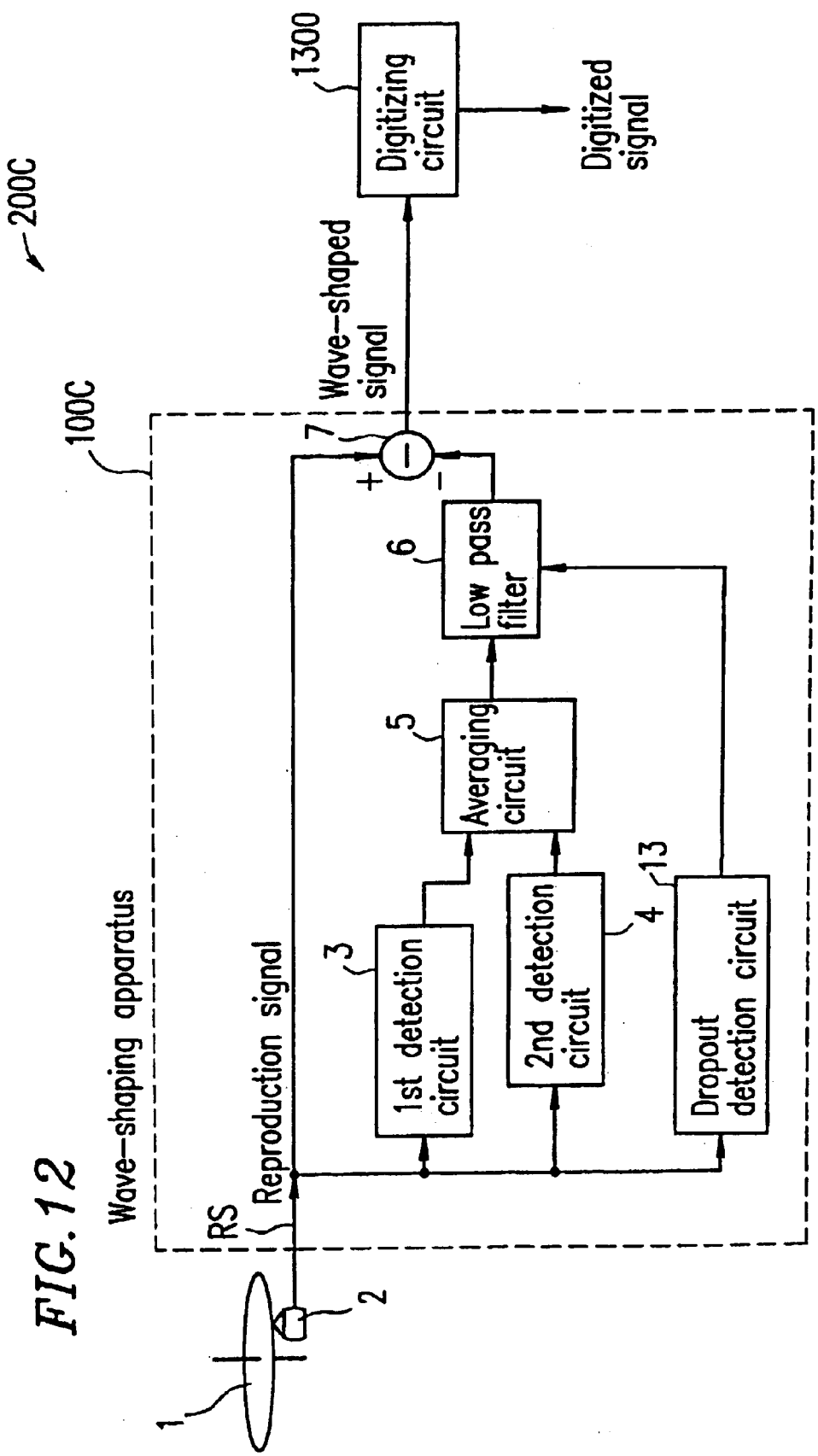
FIG. 12 is a block diagram illustrating a structure of another reproduction signal processing apparatus in a third example according to the present invention.

FIG. 12 is a block diagram of another reproduction signal processing apparatus 200C in the third example according to the present invention. Identical elements previously discussed with respect to FIG. 11 bear identical reference numerals and the descriptions thereof will be omitted. The reproduction signal processing apparatus 200C includes a wave-shaping apparatus 100C and the digitizing circuit 1300.

When the dropout detection circuit 13 detects a dropout, the cutoff frequency of the low pass filter 6 is set at higher than the time constant when no dropout is detected. Accordingly, when a dropout is detected, a hazardous DC fluctuation component generated in a period corresponding to a disturbance caused by a defect is allowed to pass through the low pass filter 6. When no dropout is detected (normal reproduction), the noise or the like generated in the first or second detection circuit 3 or 4 is suppressed. Accordingly, the slicing performance obtained when the light beam passes through the defect of the optical disk 1 (FIG. 1) is improved while the generation of jitters when the optical disk 1 has no defect is not deteriorated.

In the first through third examples, the reproduction signal processing apparatuses respectively including the wave-shaping apparatuses 100, 100A and 100B which are used for pre-processing the signal before the signal is input to the digitizing circuit 1300. The present invention is not limited to these apparatuses and is applicable to any apparatus for pre-processing a signal before the signal is input to an A/D converter.

Figure 13:
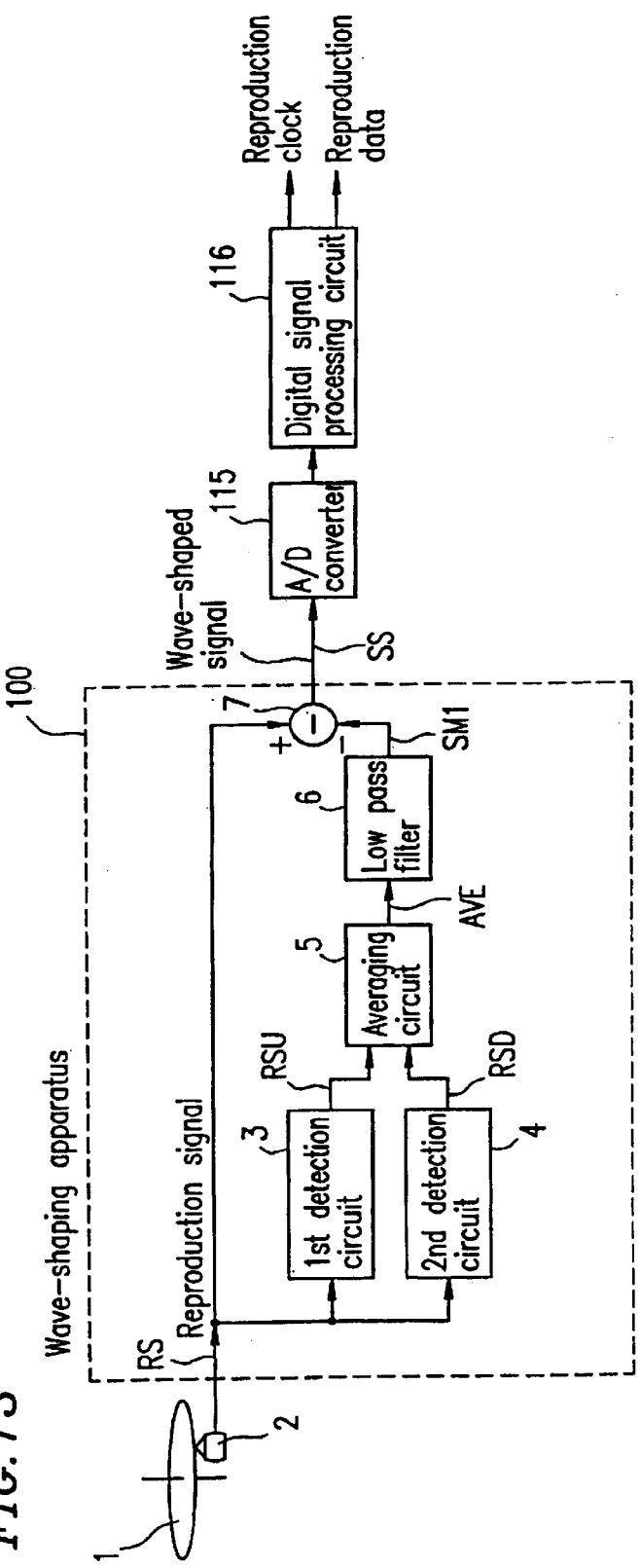
FIG. 13 is a block diagram illustrating a structure of still another reproduction signal processing apparatus in a third example according to the present invention.
Figure 14A:
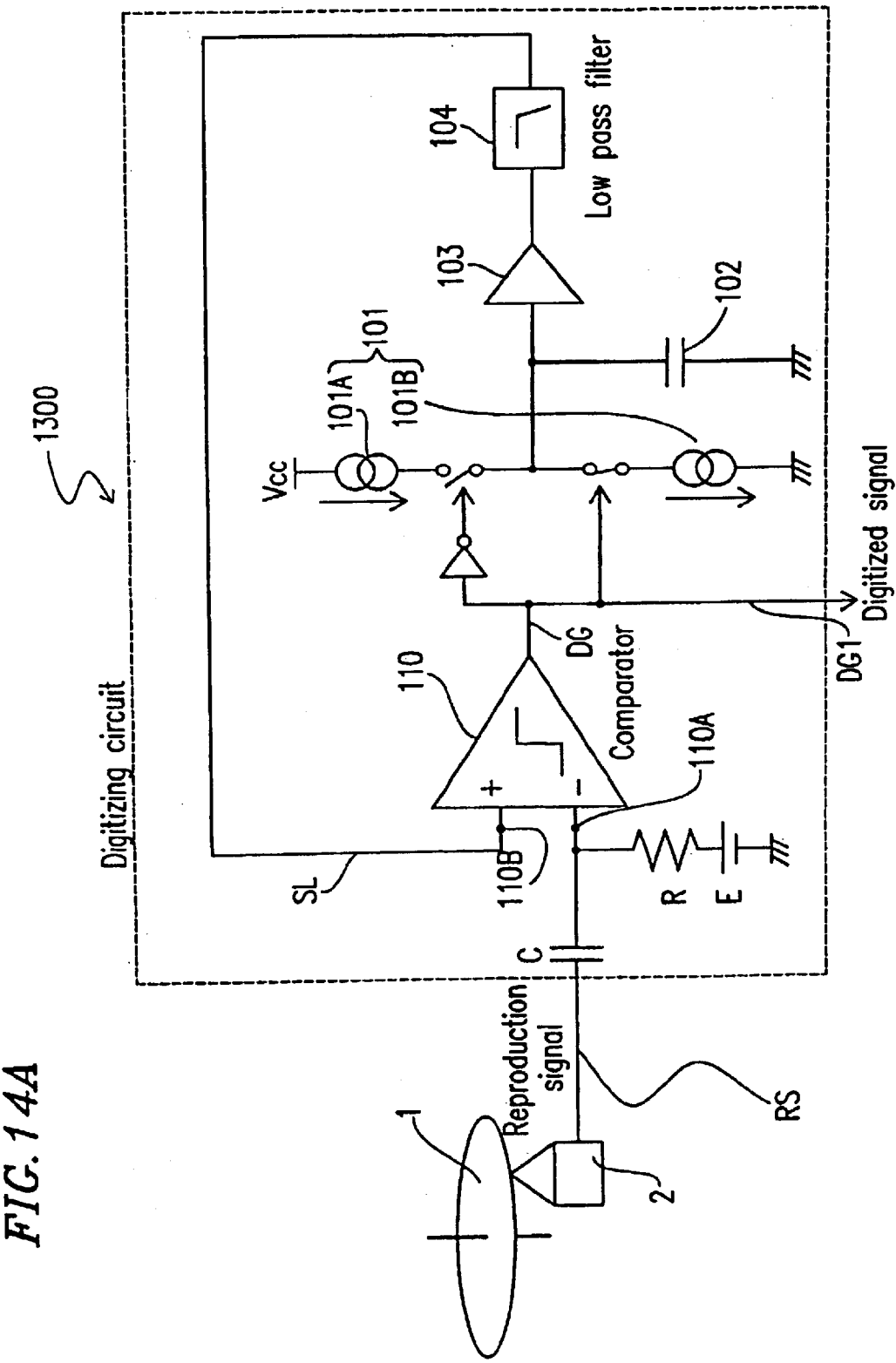
FIG. 14A is a block diagram illustrating a structure of a digitizing circuit.

FIG. 13 is a block diagram illustrating a structure of still another reproduction signal processing apparatus 200D in the third example according to the present invention. Identical elements previously discussed with respect to FIG. 1 bear identical reference numerals and the descriptions thereof will be omitted.

The reproduction signal processing apparatus 200D includes the wave-shaping apparatus 100, an A/D converter 115 for performing A/D conversion of a wave-shaped signal SS output by the wave-shaping apparatus 100, and a digital signal processing circuit 116 for performing digital signal processing of the signal output by the A/D converter 115 and outputting reproduction data and a reproduction clock.

As described in the first through third examples, the wave-shaping apparatus outputs a wave-shaped signal SS which is accurately digitized reproduction signal even when the level of the reproduction signal significantly fluctuated by a defect on an optical disk. Such a function of the wave-shaping apparatus stabilizes the performance of the digital signal processing circuit 116.

In this manner, the wave-shaping apparatus 100 is usable for pre-processing a signal before the signal is input to the A/D converter 115. The wave-shaping apparatuses 100A and 100B are also usable for pre-processing a signal before the signal is input to an A/D converter.

As described above, the present invention provides a wave-shaping apparatus and a reproduction signal processing apparatus, which accurately digitizes a reproduction signal even when the level of the reproduction signal obtained from an optical disk significantly fluctuates by a defect on the optical disk as well as when the optical disk has no defect. The wave-shaping apparatus according to the present invention further makes maximum use of the dynamic range of an A/D converter, and improves the stability of the digital signal processing circuit. Thus, the wave-shaping apparatus and the reproduction signal processing apparatus according to the present invention alleviate the load of a digitizing circuit and significantly decrease the generation of jitters.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A wave-shaping apparatus comprising:
   a first detection circuit for detecting a reproduction signal reproduced from an optical disk by an optical pickup circuit using a first detection time constant to detect an upper envelope of the reproduction signal;
   a second detection circuit for detecting the reproduction signal using a second detection time constant to detect a lower envelope of the reproduction signal;
   an averaging circuit for putting a weight represented by a weighting coefficient to each of the upper envelope and the lower envelope to calculate an average value of each of the upper envelope and the lower envelope;
   a subtraction circuit for subtracting a signal corresponding to the average value from the reproduction signal to output a wave-shaped signal; and
   a low pass filter for smoothing the average value to output a smoothing signal wherein the subtraction circuit subtracts the smoothing signal from the reproduction signal.

2. A wave-shaping apparatus according to claim 1, wherein the weighting coefficient is 1:1.

3. A wave-shaping apparatus according to claim 1, wherein the weighting coefficient is determined based on an asymmetry quantity of the reproduction signal.

4. A wave-shaping apparatus according to claim 3, further comprising an asymmetry detection circuit for detecting the asymmetry quantity.

5. A wave-shaping apparatus according to claim 1, wherein at least one of the first detection time constant and the second detection time constant is determined to be substantially in proportion to a diameter of a light spot on the optical disk.

6. A wave-shaping apparatus according to claim 1, wherein at least one of the first detection time constant and the second detection time constant is determined to be substantially in inverse proportion to a reproduction linear velocity of the optical disk.

7. A wave-shaping apparatus according to claim 1, wherein a cutoff frequency of the low pass filter is determined to be substantially in inverse proportion to a diameter of a light spot on the optical disk.

8. A wave-shaping apparatus according to claim 1, wherein a cutoff frequency of the low pass filter is determined to be substantially in proportion to a reproduction linear velocity of the optical disk.

9. A wave-shaping apparatus according to claim 1, further comprising a dropout detection circuit for detecting a dropout indicating a decrease in an amplitude of the reproduction signal, wherein when the dropout is detected by the dropout detection circuit, the cutoff frequency of the low pass filter is set to be higher than the time constant when no dropout is detected.

10. A wave-shaping apparatus, comprising:
   a first detection circuit for detecting a reproduction signal reproduced from an optical disk by an optical pickup circuit using a first detection time constant to detect an upper envelope of the reproduction signal;
   a second detection circuit for detecting the reproduction signal using a second detection time constant to detect a lower envelope of the reproduction signal;
   an averaging circuit for putting a weight represented by a weighting coefficient to each of the upper envelope and the lower envelope to calculate an average value of each of the upper envelope and the lower envelope;
   a subtraction circuit for subtracting a signal corresponding to the average value from the reproduction signal to output a wave-shaped signal; and
   a dropout detection circuit for detecting a dropout indicating a decrease in an amplitude of the reproduction signal, wherein the dropout is detected by the dropout detection circuit, at least one of the first detection time constant and the second detection time constant is set to be shorter than the time constant when no dropout is detected.

11. A reproduction signal processing apparatus, comprising:
   a wave-shaping apparatus including:
      a first detection circuit for detecting a reproduction signal reproduced from an optical disk by an optical pickup circuit using a first detection time constant to detect an upper envelope of the reproduction signal;
      a second detection circuit for detecting the reproduction signal using a second detection time constant to detect a lower envelope of the reproduction signal;
      an averaging circuit for putting a weight represented by a weighting coefficient to each of the upper envelope and the lower envelope to calculate an average value of each of the upper envelope and the lower envelope;
      a subtraction circuit for subtracting a signal corresponding to the average value from the reproduction signal to output a wave-shaped signal;
      a low pass filter for smoothing the average value to output a smoothing signal, wherein the subtraction circuit subtracts the smoothing signal from the reproduction signal, and
   a digitizing circuit for digitizing the wave-shaped signal to output a digitized signal.

12. A reproduction signal processing apparatus, comprising:
   a wave-shaping apparatus including:
      a first detection circuit for detecting a reproduction signal reproduced from an optical disk by an optical pickup circuit using a first detection time constant to detect an upper envelope of the reproduction signal;
      a second detection circuit for detecting the reproduction signal using a second detection time constant to detect a lower envelope of the reproduction signal;
      an averaging circuit for putting a weight represented by a weighting coefficient to each of the upper envelope and the lower envelope to calculate an average value of each of the upper envelope and the lower envelope;
      a subtraction circuit for subtracting a signal corresponding to the average value from the reproduction signal to output a wave-shaped signal;
      a low pass filter for smoothing the average value to output a smoothing signal, wherein the subtraction circuit subtracts the smoothing signal from the reproduction signal; and
   an analog/digital converter for performing analog/digital conversion of the wave-shaped signal.

13. A reproduction signal processing circuit according to claim 12, further comprising a digital signal processing circuit for performing digital signal processing of an output from the analog/digital converter to output reproduction data and a reproduction clock.

* * * * *